(12) United States Patent (10) Patent No.: US 9,258,171 B2
Fan (45) Date of Patent: *Feb. 9, 2016

(54) METHOD AND SYSTEM FOR AN OS VIRTUALIZATION-AWARE NETWORK INTERFACE CARD

(71) Applicant: BROADCOM CORPORATION, Irvine, CA (US)

(72) Inventor: Kan F. Fan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,272

(22) Filed: Dec. 19, 2013

(65) Prior Publication Data

US 2014/0108676 A1 Apr. 17, 2014

Related U.S. Application Data

(63) Continuation of application No. 11/435,075, filed on May 16, 2006, now Pat. No. 8,635,388.

(60) Provisional application No. 60/788,396, filed on Mar. 31, 2006.

(51) Int. Cl.
*G06F 15/16* (2006.01)
*H04L 29/06* (2006.01)
(Continued)

(52) U.S. Cl.
CPC ...... *H04L 29/06095* (2013.01); *G06F 9/45558* (2013.01); *H04L 49/90* (2013.01);
(Continued)

(58) Field of Classification Search
CPC ............. H04L 29/06095; H04L 49/90; G06F 9/45558

USPC ............. 710/8–10, 52, 64, 74; 719/318; 709/223, 224; 711/4

See application file for complete search history.

(56) References Cited

U.S. PATENT DOCUMENTS

| 5,414,851 A | 5/1995 | Brice, Jr. et al. |
| 7,299,468 B2 | 11/2007 | Casey et al. |

(Continued)

FOREIGN PATENT DOCUMENTS

CN 1679282 10/2005

OTHER PUBLICATIONS

European Search Report for European Patent Application No. 06024399.5-1244, dated Dec. 14, 2009.

*Primary Examiner* — Tammara Peyton
(74) *Attorney, Agent, or Firm* — Oblon, McClelland, Maier & Neustadt, L.L.P.

(57) ABSTRACT

Aspects of a method and system for an operating system (OS) virtualization-aware network interface card (NIC) are provided. A NIC may provide direct I/O capabilities for each of a plurality of concurrent guest operating systems (GOSs) in a host system. The NIC may comprise a GOS queue for each of the GOSs, where each GOS queue may comprise a transmit (TX) queue, a receive (RX) queue, and an event queue. The NIC may communicate data with a GOS via a corresponding TX queue and RX queue. The NIC may notify a GOS of events such as down link, up link, packet transmission, and packet reception via the corresponding event queue. The NIC may also support unicast, broadcast, and/or multicast communication between GOSs. The NIC may also validate a buffered address when the address corresponds to one of the GOSs operating in the host system.

20 Claims, 8 Drawing Sheets

(51) Int. Cl.
  H04L 12/861 (2013.01)
  G06F 9/455 (2006.01)
  H04L 29/12 (2006.01)

(52) U.S. Cl.
  CPC .. H04L49/9063 (2013.01); *G06F 2009/45595* (2013.01); *H04L 29/12839* (2013.01); *H04L 61/6022* (2013.01)

(56) References Cited

U.S. PATENT DOCUMENTS

| | | | |
|---|---|---|---|
| 7,313,669 B2 | 12/2007 | Neiger et al. | |
| 7,353,360 B1 * | 4/2008 | Muller et al. | 711/203 |
| 7,356,818 B2 | 4/2008 | Carollo et al. | |
| 7,478,173 B1 * | 1/2009 | Delco | 709/250 |
| 7,979,548 B2 * | 7/2011 | Arndt et al. | 709/226 |
| 8,230,153 B2 * | 7/2012 | El Zur | 711/4 |
| 8,250,586 B2 | 8/2012 | Nelson | |
| 8,635,388 B2 * | 1/2014 | Fan | 710/52 |
| 2005/0071472 A1 | 3/2005 | Arndt et al. | |
| 2006/0174251 A1 | 8/2006 | Pope et al. | |
| 2006/0206300 A1 | 9/2006 | Garg et al. | |
| 2007/0244972 A1 | 10/2007 | Fan | |
| 2009/0222558 A1 * | 9/2009 | Xu et al. | 709/224 |

* cited by examiner

METHOD AND SYSTEM FOR AN OS VIRTUALIZATION-AWARE NETWORK INTERFACE CARD

CROSS-REFERENCE TO RELATED APPLICATIONS/INCORPORATION BY REFERENCE

The application is a continuation of U.S. utility application entitled "Method and System for an OS Virtualization-Aware Network Interface Card," having Ser. No. 11/435,075, filed on May 16, 2006, which makes reference to, claims priority to, and claims the benefit of U.S. Provisional Application Ser. No. 60/788,396 filed on Mar. 31, 2006.

The above stated applications are hereby incorporated by reference in their entireties.

FIELD OF THE INVENTION

Certain embodiments of the present invention relate to processing of TCP data and related TCP information. More specifically, certain embodiments relate to a method and system for an operating system (OS) virtualization-aware network interface card (NIC).

BACKGROUND OF THE INVENTION

In networking systems, a single server may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single operation may result in an improvement in server efficiency. However, consolidation also removes the level of protection that is provided when the operations are maintained separate. For example, when the operations are consolidated, a crash or failure in a database server may also result in the loss of email services, exchange services, and/or application services.

Another approach for improving server efficiency may be to utilize multiple operating systems running concurrently to so that each operating system supports a different server operation, for example. The multiple operation systems may be referred to as guest operating systems (GOSs). This approach maintains the level of protection provided when server operations are not consolidated while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner.

A hardware resource that may be frequently utilized by at least one of the server operations or services is the NIC. In this regard, a hypervisor or VM monitor may enable creating a software representation of NIC that may be utilized by a GOS. This software representation of the NIC may be referred to as a "virtual NIC." However, a virtual NIC may be limited as to the kind of features or functionalities of the NIC that may be provided to the GOSs. For example, a virtual NIC may not be able to support transmission control protocol (TCP) offload functions. Offloading at least part of the TCP processing from the CPU to a processor on the NIC may provide improved network throughput. Without offloading capabilities, the data rate of the server may be limited in some circumstances. Another limiting aspect may be that a virtual NIC may only provide basic layer 2 (L2) networking functionality to the multiple GOSs. The virtual NIC may be limited to providing data communication between the GOSs and the network. In this regard, the virtual NIC may not be able to support other advanced features such as remote direct memory access (RDMA) and/or Internet small computers system interface (iSCSI), for example.

In addition to the limitations on the kind of features that may be provided by the virtual NIC, the hypervisor may also be required to do a significant amount of work when managing the interaction between the multiple GOSs and the server's hardware resources. Utilizing a hypervisor layer may introduce an overhead penalty to basic L2 networking operations that may not be present when a single OS is utilized. For example, when data is to be transmitted from any of the GOSs, the hypervisor may be required to arbitrate access to the NIC. When data is received by the NIC, the hypervisor may be required to determine which one is the appropriate GOS to send the received data. Moreover, because each GOS and the hypervisor may utilize different portions of memory, the hypervisor may have the added responsibility of managing the transfer of data from one portion of memory to another.

Due to the growing demand to support multiple GOSs in a single server, new solutions may require that the overhead introduced by the presence of a hypervisor layer be reduced and/or that advance features may be supported by the virtualization of a portion of the server's hardware resources such as the network interface card.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an operating system (OS) virtualization-aware network interface card (NIC), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1 is a block diagram of an exemplary network interface card (NIC) communicatively to a host system that supports a plurality of guest operating systems (GOSs), in connection with an embodiment of the invention.

DETAILED DESCRIPTION OF THE INVENTION

Certain embodiments of the invention may be found in a method and system for an operating system (OS) virtualization-aware network interface card (NIC). Aspects of the method and system may comprise a NIC that provides direct I/O capabilities for each of a plurality of concurrent guest operating systems (GOSs) in a host system. The NIC may comprise a GOS queue for each of the GOSs, where each GOS queue may comprise a transmit (TX) queue, a receive (RX) queue, and an event queue. The NIC may communicate data with a GOS via a corresponding TX queue and RX queue. The NIC may notify a GOS of events such as down link, up link, packet transmission, and packet reception via the corresponding event queue. The NIC may also support unicast, broadcast, and/or multicast communication between GOSs. The NIC may also validate a buffered address when the address corresponds to one of the GOSs operating in the host system.

Figure 1:
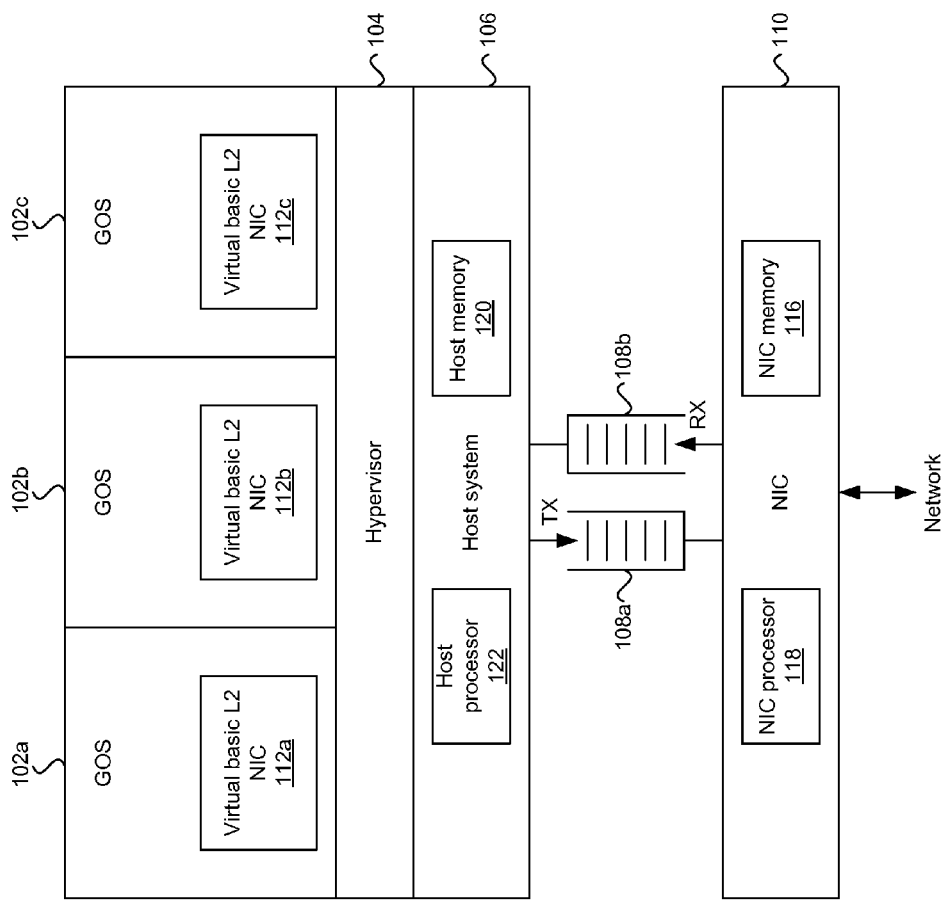

FIG. 1 is a block diagram of an NIC communicatively coupled a host system that supports a plurality of GOSs, in connection with an embodiment of the invention. Referring to FIG. 1, there is shown a first GOS 102a, a second GOS 102b, a third GOS 102c, a hypervisor 104, a host system 106, a transmit (TX) queue 108a, a receive (RX) queue 108b, and a NIC 110. The NIC 110 may comprise a NIC processor 118 and a NIC memory 116. The host system 106 may comprise a host processor 122 and a host memory 120.

The host system 106 may comprise suitable logic, circuitry, and/or code that may enable data processing and/or networking operations, for example. In some instances, the host system 106 may also comprise other hardware resources such as a graphics card and/or a peripheral sound card, for example. The host system 106 may support the operation of the first GOS 102a, the second GOS 102b, and the third GOS 102c via the hypervisor 104. The number of GOSs that may be supported by the host system 106 by utilizing the hypervisor 104 need not be limited to the exemplary embodiment described in FIG. 1. For example, two or more GOSs may be supported by the host system 106.

The hypervisor 104 may operate as a software layer that may enable OS virtualization of hardware resources in the host system 106 and/or virtualization of hardware resources communicatively connected to the host system 106, such as the NIC 110, for example. The hypervisor 104 may also enable data communication between the GOSs and hardware resources in the host system 106 and/or hardware resources communicatively connected to the host system 106. For example, the hypervisor 204 may enable packet communication between GOSs supported by the host system 106 and the NIC 110 via the TX queue 108a and/or the RX queue 108b.

The host processor 122 may comprise suitable logic, circuitry, and/or code that may enable control and/or management of the data processing and/or networking operations associated with the host system 106. The host memory 120 may comprise suitable logic, circuitry, and/or code that may enable storage of data utilized by the host system 106. The host memory 120 may be partitioned into a plurality of memory portions. For example, each GOS supported by the host system 106 may have a corresponding memory portion in the host memory 120. Moreover, the hypervisor 104 may have a corresponding memory portion in the host memory 120. In this regard, the hypervisor 104 may enable data communication between GOSs by controlling the transfer of data from a portion of the memory 120 that corresponds to one GOS to another portion of the memory 120 that corresponds to another GOS.

The NIC 110 may comprise suitable logic, circuitry, and/or code that may enable communication of data with a network. The NIC 110 may enable basic level 2 (L2) switching operations, for example. The TX queue 108a may comprise suitable logic, circuitry, and/or code that may enable posting of data for transmission via the NIC 110. The RX queue 108b may comprise suitable logic, circuitry, and/or code that may enable posting of data received via the NIC 110 for processing by the host system 106. In this regard, the NIC 110 may post data received from the network in the RX queue 108b and may retrieve data posted by the host system 106 in the TX queue 108a for transmission to the network. The TX queue 108a and the RX queue 108b may be integrated into the NIC 110, for example. The NIC processor 118 may comprise suitable logic, circuitry, and/or code that may enable control and/or management of the data processing and/or networking operations in the NIC 110. The NIC memory 116 may comprise suitable logic, circuitry, and/or code that may enable storage of data utilized by the NIC 110.

The first GOS 102a, the second GOS 102b, and the third GOS 102 may each correspond to an operating system that may enable the running or execution of operations or services such as applications, email server operations, database server operations, and/or exchange server operations, for example. The first GOS 102a may comprise a virtual NIC 112a, the second GOS 102b may comprise a virtual NIC 112b, and the third GOS 102c may comprise a virtual NIC 112c. The virtual NIC 112a, the virtual NIC 112b, and the virtual NIC 112c may correspond to software representations of the NIC 110 resources, for example. In this regard, the NIC 110 resources may comprise the TX queue 108a and the RX queue 108b. Virtualization of the NIC 110 resources via the virtual NIC 112a, the virtual NIC 112b, and the virtual NIC 112c may enable the hypervisor 104 to provide L2 switching support provided by the NIC 110 to the first GOS 102a, the second GOS 102b, and the third GOS 102. In this instance, however, virtualization of the NIC 110 resources by the hypervisor 104 may not enable the support of other advanced functions such as TCP offload, iSCSI, and/or RDMA in a GOS.

In operation, when a GOS in FIG. 1A needs to send a packet to the network, the packet transmission may be controlled at least in part by the hypervisor 104. The hypervisor 104 may arbitrate access to the NIC 110 resources when more than one GOS needs to send a packet to the network. In this regard, the hypervisor 104 may utilize the virtual NIC to indicate to the corresponding GOS the current availability of NIC 110 transmission resources as a result of the arbitration. The hypervisor 104 may coordinate the transmission of packets from the GOSs by posting the packets in the TX queue 108a in accordance with the results of the arbitration operation. The arbitration and/or coordination operations that occur in the transmission of packets may result in added overhead to the hypervisor 104.

When receiving packets from the network via the NIC 110, the hypervisor 104 may determine the media access control (MAC) address associated with the packet in order to transfer the received packet to the appropriate GOS. In this regard, the hypervisor 104 may receive the packets from the RX queue 108b and may demultiplex the packets for transfer to the appropriate GOS. After a determination of the MAC address and appropriate GOS for a received packet, the hypervisor 104 may transfer the received packet from a buffer in the hypervisor portion of the host memory 120 to a buffer in the portion of the host memory 120 that corresponds to the appropriate GOS. The operations associated with receiving packets and transferring packets to the appropriate GOS may also result in added overhead to the hypervisor 104.

Figure 2A:
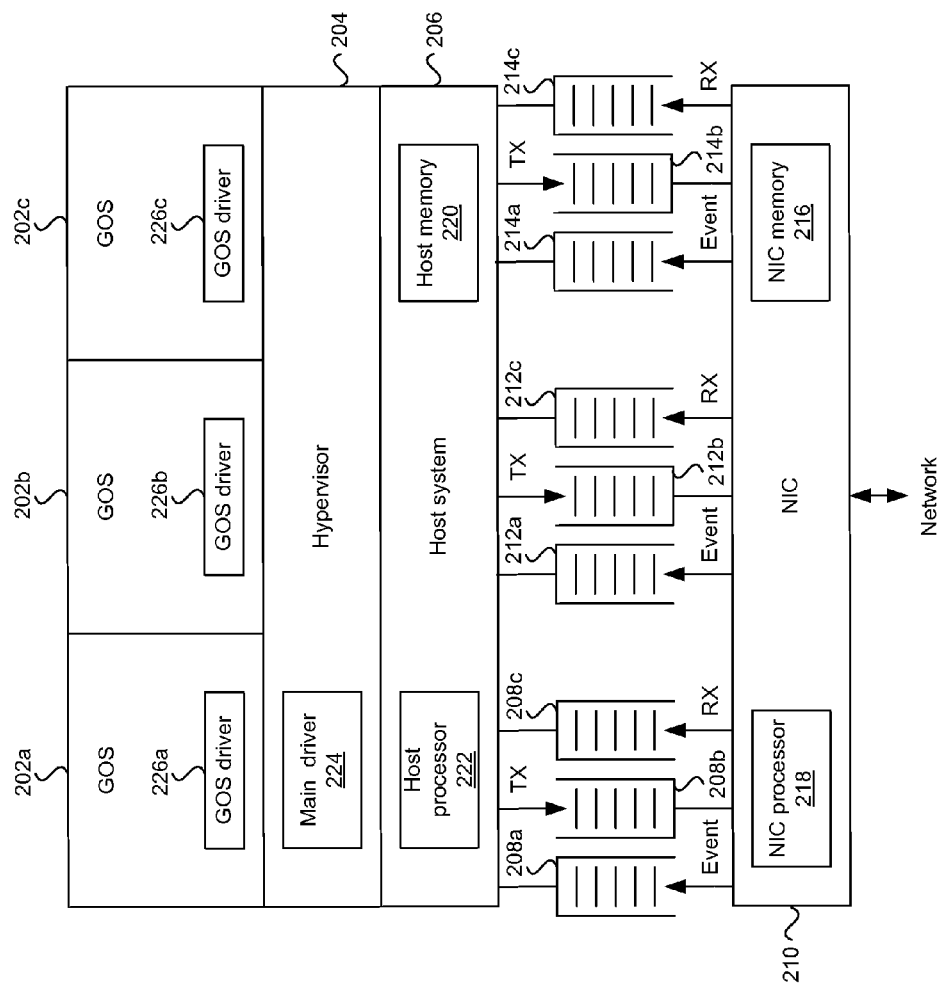
FIG. 2A is a block diagram of an exemplary operating system (OS) virtualization-aware NIC, in accordance with an embodiment of the invention.

FIG. 2A is a block diagram of an exemplary operating system (OS) virtualization-aware NIC, in accordance with an embodiment of the invention. Referring to FIG. 2A, there is shown a first GOS 202a, a second GOS 202b, a third GOS 202c, a hypervisor 204, a host system 206, event queues 208a, 212a, and 214a, transmit (TX) queues 208b, 212b, and 214b, receive (RX) queues 208c, 212c, and 214c, and a NIC 210. The NIC 210 may comprise a NIC processor 218 and a NIC memory 216. The host system 206 may comprise a host processor 222 and a host memory 220. The hypervisor 204 may comprise a main driver 224.

The host system 206 may comprise suitable logic, circuitry, and/or code that may enable data processing and/or networking operations, for example. In some instances, the host system 206 may also comprise other hardware resources such as a graphics card and/or a peripheral sound card, for example. The host system 206 may support the operation of the first GOS 202a, the second GOS 202b, and the third GOS 202c via the hypervisor 204. The first GOS 202a, the second GOS 202b, and the third GOS 202 may each correspond to an operating system that may enable the running or execution of operations or services such as applications, email server operations, database server operations, and/or exchange server operations, for example. The number of GOSs that may be supported by the host system 206 by utilizing the hypervisor 104 need not be limited to the exemplary embodiment described in FIG. 2A. For example, two or more GOSs may be supported by the host system 206.

The hypervisor 204 may operate as a software layer that may enable OS virtualization of hardware resources in the host system 206 and/or virtualization of hardware resources communicatively connected to the host system 206, such as the NIC 210, for example. The hypervisor 204 may also enable data communication between the GOSs and hardware resources in the host system 206 and/or hardware resources communicatively connected to the host system 206. For example, the hypervisor 204 may enable communication between the GOSs supported by the host system 206 and the NIC 210 via the event queues 208a, 212a, and 214a, the TX queues 208b, 212b, and 214b, and/or the RX queues 208c, 212c, and 214c. In this regard, communication between the first GOS 202a and the NIC 210 may occur via the event queue 208a, the TX queue 208b, and the RX queue 208c. Similarly, communication between the second GOS 202b and the NIC 210 may occur via the event queue 212a, the TX queue 212b, and the RX queue 212c. Communication between the third GOS 202c and the NIC 210 may occur via the event queue 214a, the TX queue 214b, and the RX queue 214c. In this regard, each set of queues may operate separately and independently from the others.

The hypervisor 204 may comprise a main driver 224 that may coordinate the transfer of data between the GOSs and the queues. The main driver 224 may communicate with the GOS driver 226a in the GOS 202a, the GOS driver 226b in the GOS 202b, and/or the GOS driver 226c in the GOS 202c. Each GOS driver may correspond to a portion of a GOS that may enable transfer of data between the operations or services performed by the GOS and the appropriate queues via the main driver 224. For example, packets and/or descriptors of packets for transmission from an operation or service in the first GOS 202a may be transferred to the TX queue 208b by the GOS driver 226a. In another example, data posted to the event queue 208a to indicate a network condition or to report data transmission or data reception by the NIC 210, may be transferred to a buffer posted by the GOS driver 226a. In another example, packets received by the NIC 210 from the network that have a MAC address that corresponds to the first GOS 202a may be transferred from the RX queue 208c to a buffer posted by the GOS driver 226a.

The host processor 222 may comprise suitable logic, circuitry, and/or code that may enable control and/or management of the data processing and/or networking operations associated with the host system 206. The host memory 220 may comprise suitable logic, circuitry, and/or code that may enable storage of data utilized by the host system 206. The host memory 220 may be partitioned into a plurality of memory portions. For example, each GOS supported by the host system 206 may have a corresponding memory portion in the host memory 220. Moreover, the hypervisor 204 may have a corresponding memory portion in the host memory 1220. In this regard, the hypervisor 204 may enable data communication between GOSs by controlling the transfer of data from a portion of the memory 220 that corresponds to one GOS to another portion of the memory 220 that corresponds to another GOS.

The NIC 210 may comprise suitable logic, circuitry, and/or code that may enable communication of data with a network. The NIC 210 may enable basic L2 switching, TCP offload, iSCSI, and/or RDMA operations, for example. The NIC 210 may be referred to an OS virtualization-aware NIC because communication with each GOS occurs by an independent set of queues. The NIC 210 may determine the MAC address of received packets and may transfer the received packets to the RX queue that corresponds to the GOS with the appropriate MAC address. Similarly, the NIC 210 may enable transfer of packets from the GOSs to the network by coordinating and/or arbitrating the order in which packets posted for transmission in the TX queues may be transmitted. In this regard, the NIC 210 is said to enable direct input/output (I/O) or hypervisor bypass operations.

The event queues 208a, 212a, and 214a may comprise suitable logic, circuitry, and/or code that may enable posting of data by the NIC 210 to indicate the occurrence of an event. For example, the NIC 210 may post data in the event queues to indicate that the link is down or that the link is up. The current status of the link, whether it is up or down, may be posted to all the event queues, for example.

The TX queues 208b, 212b, and 214b may comprise suitable logic, circuitry, and/or code that may enable posting of data for transmission via the NIC 110 from the first GOS 202a, the second GOS 202b, and the third GOS 202c respectively. The RX queues 208c, 212c, and 214c may comprise suitable logic, circuitry, and/or code that may enable posting of data received via the NIC 110 for processing by the first GOS 202a, the second GOS 202b, and the third GOS 202c respectively. The TX queues 208b, 212b, and 214b and/or the RX queues 208c, 212c, and 214c may be integrated into the NIC 210, for example.

The NIC processor 218 may comprise suitable logic, circuitry, and/or code that may enable control and/or management of the data processing and/or networking operations in the NIC 210. The NIC memory 216 may comprise suitable logic, circuitry, and/or code that may enable storage of data utilized by the NIC 210.

Figure 2B:
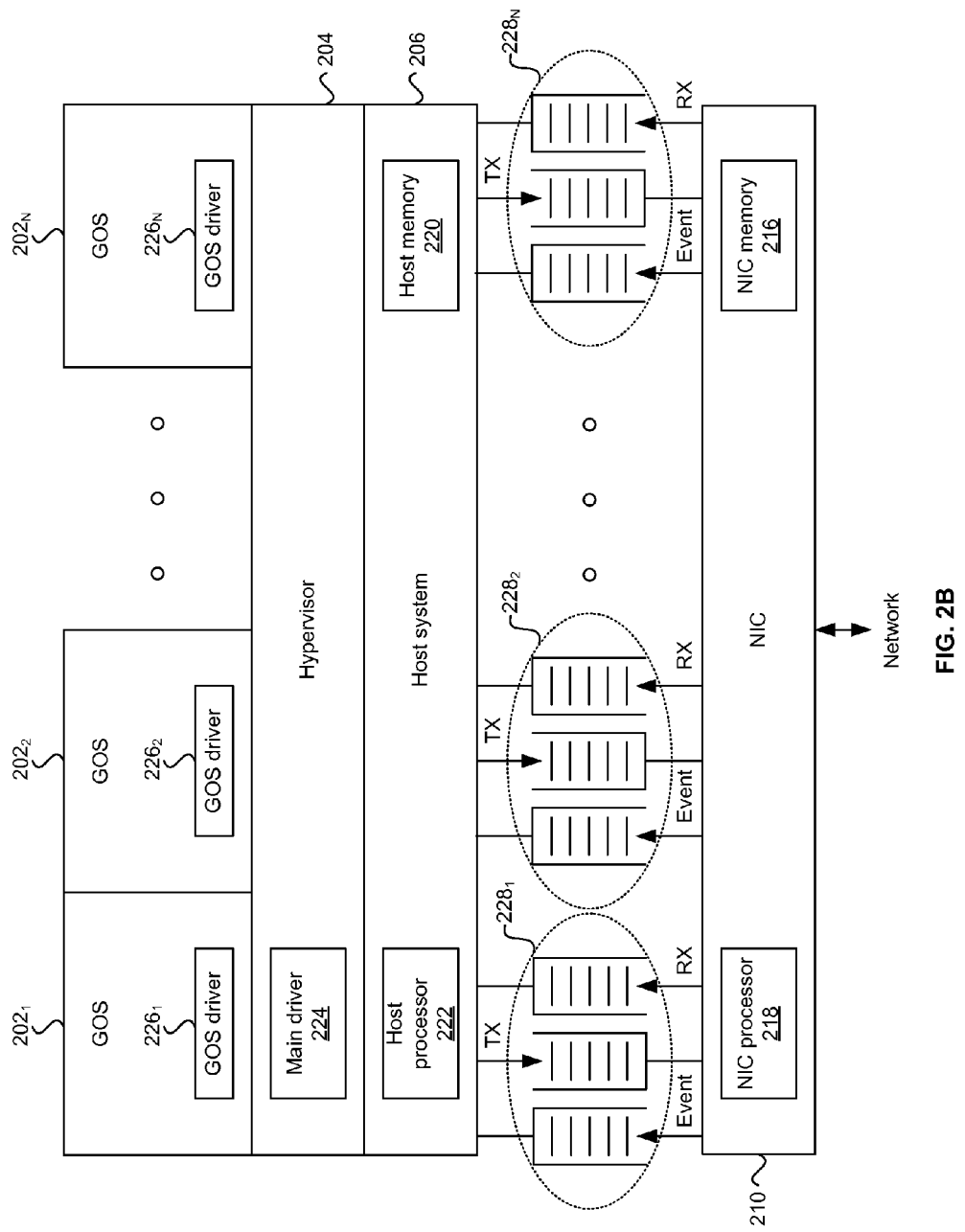
FIG. 2B is a block diagram of another exemplary OS virtualization-aware NIC, in accordance with an embodiment of the invention.

FIG. 2B is a block diagram of another exemplary OS virtualization-aware NIC, in accordance with an embodiment of the invention. Referring to FIG. 2B, there is shown a host system 206 that may support N GOSs and a NIC 210 that may support N sets of queues. The host system 206 may be substantially as described in FIG. 2A and may support the operation of GOS $202_1$, ..., GOS $202_N$, where 1≤N. Each GOS may be utilized to provide a separate operation or service, for example. The hypervisor 204 and the main driver 224 may support data communication between the N GOSs and the sets of queues $228_1$, ..., $228_N$. A portion of the host memory 220 may be associated with each of GOS $202_1$, ..., GOS $202_N$, and the hypervisor 204. The GOS drivers $228_1$, ..., $228_N$ shown in FIG. 2B may be utilized to transfer data between the operations or services executed in the GOS $202_1$, ..., GOS $202_N$ and the corresponding set of queues from the set of queues $228_1$, ..., $228_N$. The transfer of data between GOS drivers $228_1$, ..., $228_N$ and the corresponding the set of queues $228_1$, ..., $228_N$ may occur via the main driver 224. In this regard, the GOS drivers and the main driver 224 may be substantially as described in FIG. 2A.

The NIC 210 may be substantially as described in FIG. 2A and may also be referred to as an OS virtualization-aware NIC. The NIC 210 may enable communication between the network and each of the N GOSs via sets of queues $226_1$, ..., $226_N$. For example, communication between the network and the GOS $202_1$ may occur via the set of queues $226_1$. In another example, communication between the network and the GOS $202_N$ may occur via the set of queues $226_N$. Each set of queues may comprise an event queue, a transmit (TX) queue, and a receive (RX) queue. The event queues, the TX queues, and the RX queues in the set of queues $226_1$, ..., $226_N$ may be substantially as described in FIG. 2A.

Figure 2C:
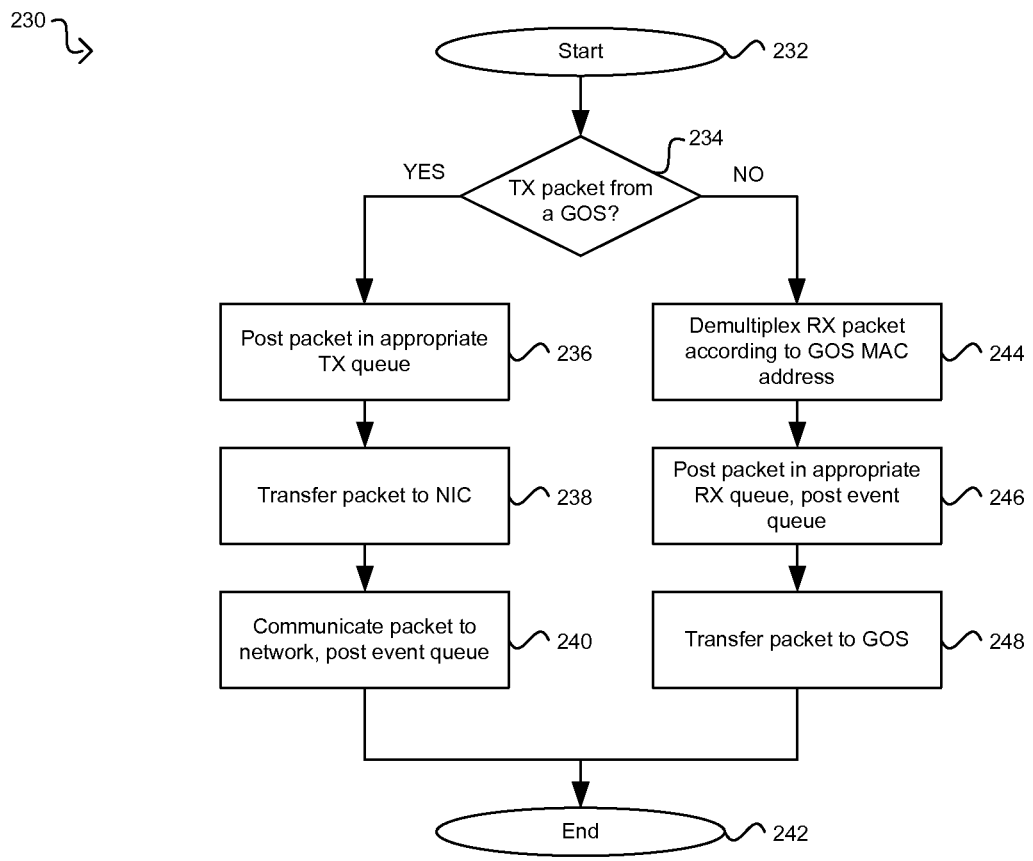
FIG. 2C is a flow diagram illustrating exemplary steps in the transmission and reception of packets via an OS virtualization-aware NIC, in accordance with an embodiment of the invention.

FIG. 2C is a flow diagram illustrating exemplary steps in the transmission and reception of packets via an OS virtualization-aware NIC, in accordance with an embodiment of the invention. Referring to FIG. 2C, there is shown a flow diagram 230. After start step 232, in step 234, when a packet is ready for transmission from a GOS to the network via the OS virtualization-aware NIC 210 in FIGS. 2A-2B, for example, the process in the flow diagram 230 may proceed to step 236. In step 236, a GOS driver in the GOS may send the packet to be posted in a corresponding TX queue via the main driver 224 in the hypervisor 204. In step 238, the packet may be transferred from the TX queue to the NIC 210 for transmission. In step 240, the NIC 210 may transfer the packet to a device and/or terminal communicatively coupled to the network. In this regard, the NIC 210 may post an indication in the event queue that corresponds to the GOS that originated the packet transmission to report that the packet has been communicated to the network. After step 240, the process in the flow diagram 230 may proceed to end step 242.

Returning to step 234, when a packet is to be received from the network by the OS virtualization-aware NIC 210 in FIGS. 2A-2B, for example, the process in the flow diagram 230 may proceed to step 244. In step 244, the NIC 210 may demultiplex packets received from the network based on the MAC address determined for each packet. In step 246, the NIC 210 may post the packet in the corresponding RX queue that is associated with the GOS that corresponds to the determined MAC address. Moreover, the NIC 210 may post an indication in the event queue associated with the GOS that corresponds to the determined MAC address to report that a packet has been received from the network. In step 248, the packet may be transferred from the RX queue to a buffer posted by the GOS driver in the corresponding GOS. In this regard, the transfer may occur via the main driver 224 in the hypervisor 204. After step 248, the process in the flow diagram 230 may proceed to end step 242.

Figure 2D:
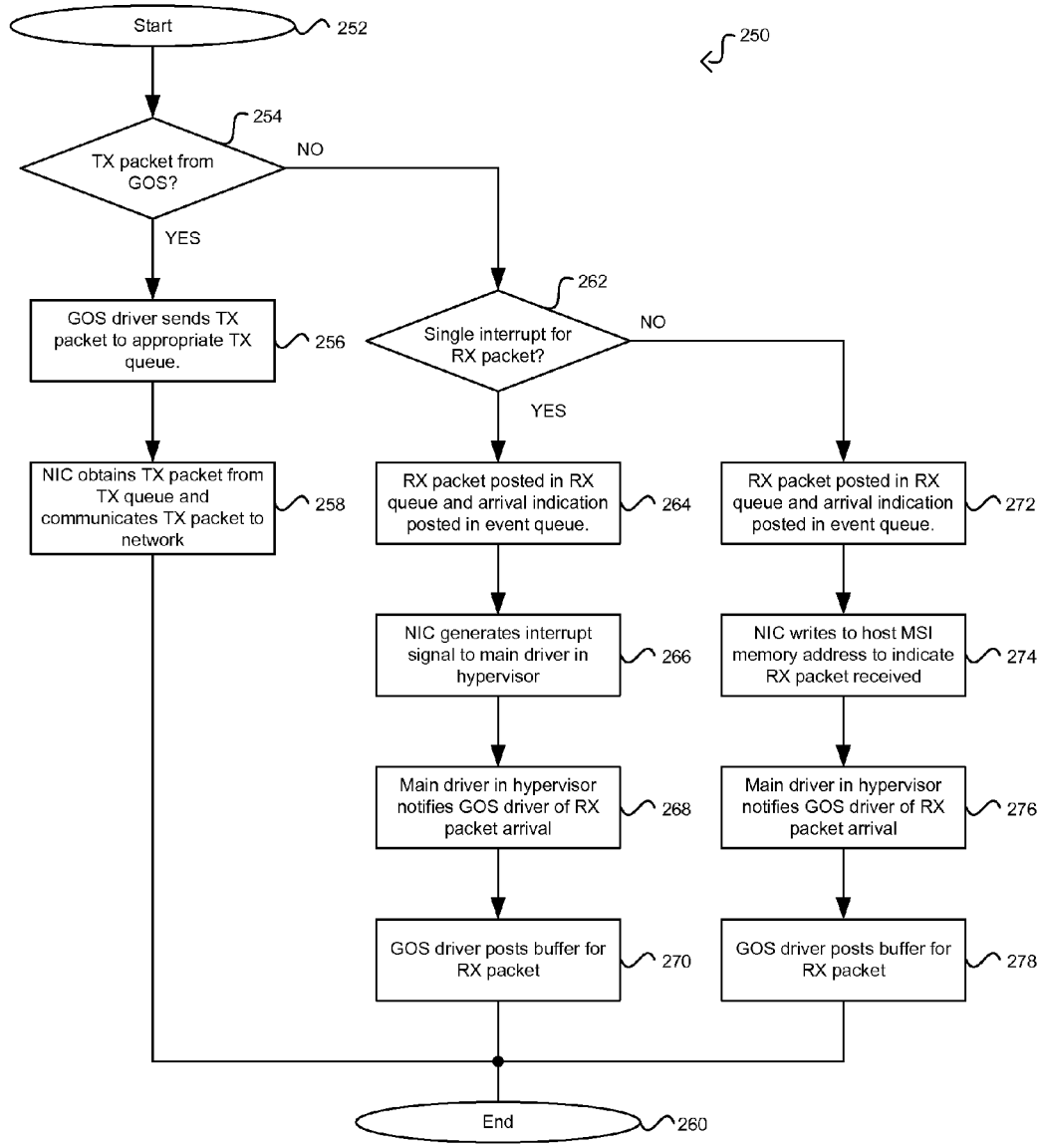
FIG. 2D is a flow diagram illustrating exemplary steps in the operation of GOS and main drivers in the transmission and reception of packets via an OS virtualization-aware NIC, in accordance with an embodiment of the invention.

FIG. 2D is a flow diagram illustrating exemplary steps in the operation of GOS and main drivers in the transmission and reception of packets via an OS virtualization-aware NIC, in accordance with an embodiment of the invention. Referring to FIG. 2D, there is shown a flow diagram 252. In step 254, when a packet is ready for transmission from a GOS to the network via the OS virtualization-aware NIC 210 in FIGS. 2A-2B, for example, the process in the flow diagram 230 may proceed to step 256. In step 256, a GOS driver in the GOS may send the packet to be posted in a corresponding TX queue via the main driver 224 in the hypervisor 204. In step 258, the packet may be transferred from the TX queue to the NIC 210 for transmission. The NIC 210 may transfer the packet to a device and/or terminal communicatively coupled to the network. In this regard, the NIC 210 may post an indication in the event queue that corresponds to the GOS that originated the packet transmission to report that the packet has been communicated to the network. After step 258, the process in the flow diagram 250 may proceed to end step 260.

Returning to step 254, when a single interrupt is to be used for packets received from the network, the process of the flow diagram 250 may proceed to step 264. In step 264, the NIC 210 may determine the MAC address for the received packet and the packet may be posted in the corresponding RX queue. Moreover, the NIC 210 may generate a packet arrival indication and may post that indication in the corresponding event queue. In step 266, the NIC 210 may generate an interrupt signal that may be transferred to the main driver 224 in the hypervisor 204. In step 268, the main driver 224 may notify the GOS driver in the GOS that corresponds to the MAC address of the received packet that a packet has been posted in the corresponding RX queue. In step 270, the GOS driver posts a buffer for storing the packet posted in the RX queue. The buffer may be posted in the portion of the host memory 220 that corresponds to the appropriate GOS. After step 270, the process of the flow diagram 250 may proceed to end step 260.

Returning to step 262, when a multiple signal interrupt (MSI) approach is to be used for packets received from the network, the process of the flow diagram 250 may proceed to step 272. In step 272, the NIC 210 may determine the MAC address for the received packet and the packet may be posted in the corresponding RX queue. Moreover, the NIC 210 may generate a packet arrival indication and may post that indication in the corresponding event queue. In step 274, MSI may be enabled between the NIC 210 and the host system 206. In this regard, the NIC 210 may generate multiple interrupt signals that may be transferred to a memory location utilized by the hypervisor 204. The NIC 210 may write to this memory location to indicate that a packet has been received for a particular GOS. In step 276, the main driver 224 may notify the corresponding GOS driver that a packet has arrived after reading the memory location that comprises the information regarding the multiple interrupt signals. In step 278, the GOS driver posts a buffer for storing the packet posted in the RX queue. The buffer may be posted in the portion of the host memory 220 that corresponds to the appropriate GOS. After step 278, the process of the flow diagram 250 may proceed to end step 260.

Figure 3:
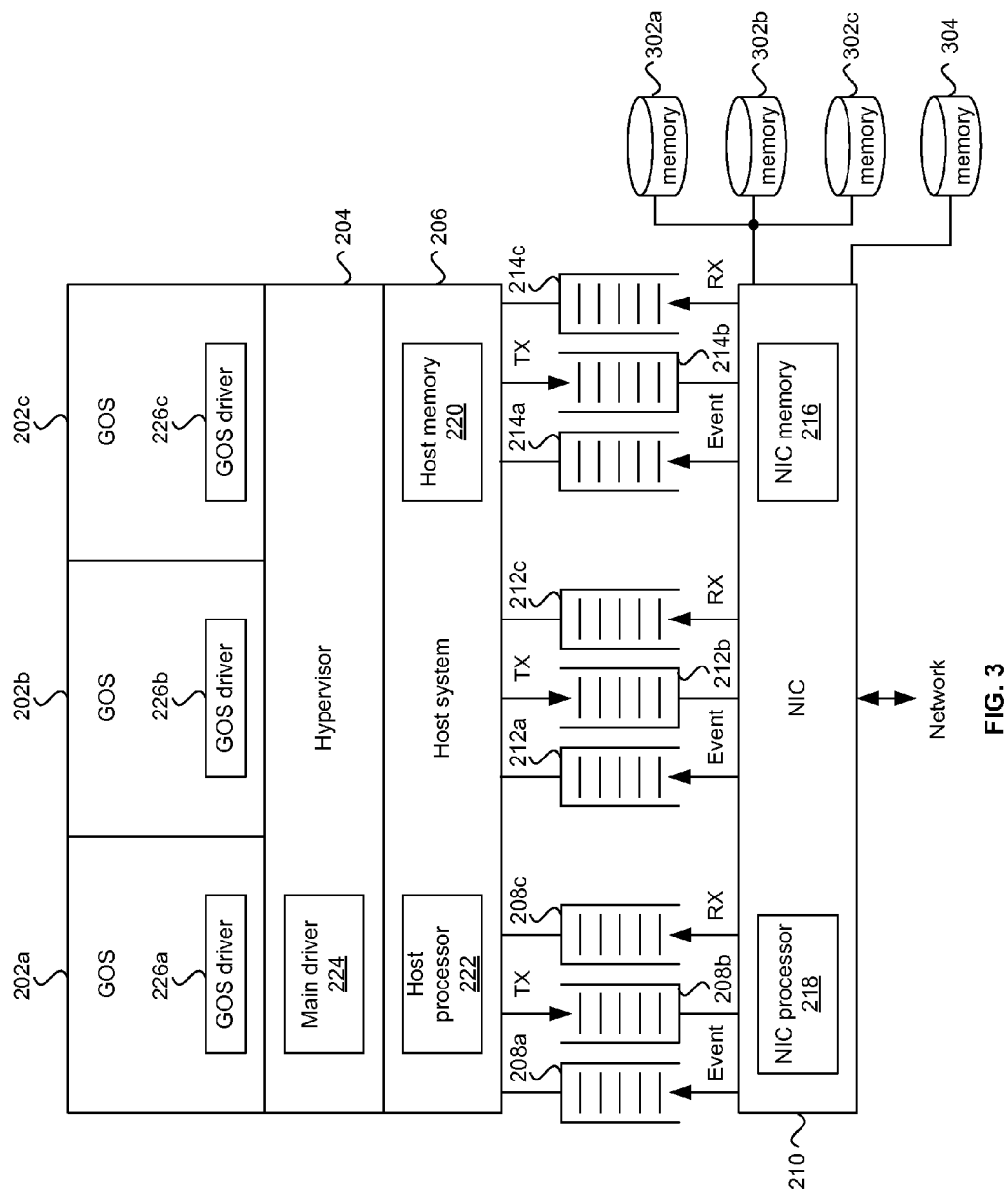
FIG. 3 is a block diagram of an exemplary OS virtualization-aware NIC that supports statistics collection, in accordance with an embodiment of the invention.

FIG. 3 is a block diagram of an exemplary OS virtualization-aware NIC that supports statistics collection, in accordance with an embodiment of the invention. Referring to FIG. 3, there is shown a NIC 210 that is substantially as described in FIGS. 2A-2B. In this regard, the NIC 210 may comprise storage or memory buffers, such as memory 302*a*, memory 302*b*, memory 302*c*, and memory 304, where the NIC 210 may store statistical information associated with the communication of packets with the network. For example, the buffers labeled memory 302*a*, memory 302*b*, and memory 302*c* may be implemented based on the NIC memory 216 and may enable storage of statistical information that corresponds to each GOS supported by the host system 206. For example, the memory 302*a* may store statistical information generated by the NIC 210 regarding packet communication by the GOS 202*a*. In another example, the memory 302*b* may store statistical information generated by the NIC 210 regarding packet communication by the GOS 202*b*. Statistical information regarding communication between the GOS 202*c* and the network may be stored in the memory 302*c*, for example. In this embodiment of the invention, statistical information for each GOS may be stored in separate buffers. In another embodiment of the invention, statistical information may be stored in a single buffer, for example.

The buffers memory 302*a*, memory 302*b*, and memory 302*c* may be utilized to store statistical information for each GOS such as the number of correct packets received by the NIC 210 for each GOS, the number of bytes in the received packets, and/or the number of packets that have been delivered correctly to each GOS, for example. These statistical metrics may be referred to as "good" statistics and may be utilized by the NIC 210 for communication operations.

The buffer memory 304 may enable the storage of statistical information regarding packet errors that may correspond to any GOS supported by the host system 206. For example, the buffer 304 may be utilized to store statistical information such as packets that do not meet cyclic redundancy check (CRC) and/or packets with length shorter that specified for Ethernet communications, for example. Because these errors may not enable the NIC 210 to determine the corresponding GOS of the packets, the NIC 210 may collect these statistics into the single buffer memory 304. These statistical metrics may be referred to as "bad" statistics and may be utilized by the NIC 210 for communication operations.

Figure 4A:
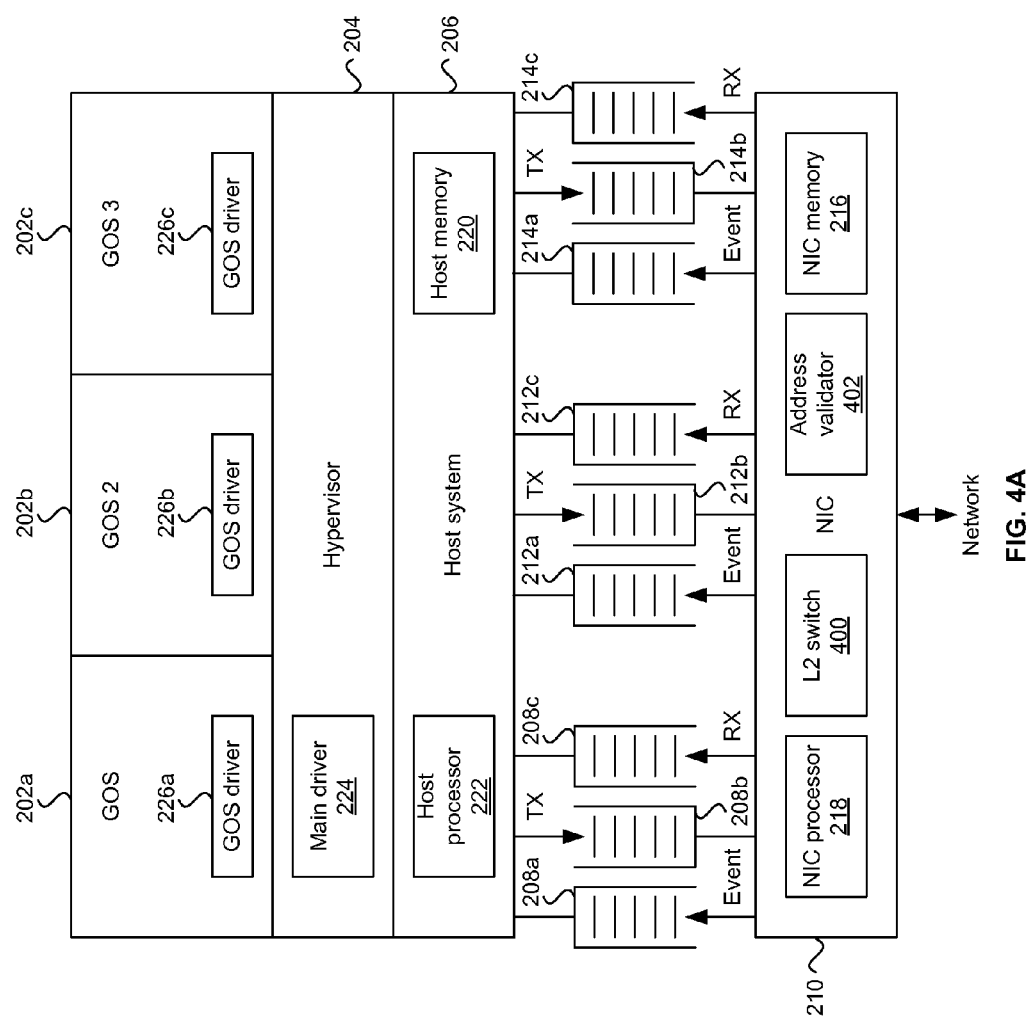
FIG. 4A is a block diagram of an exemplary OS virtualization-aware NIC that supports level 2 (L2) switching for communication between GOSs in the host system, in accordance with an embodiment of the invention.

FIG. 4A is a block diagram of an exemplary OS virtualization-aware NIC that supports level 2 (L2) switching for communication between GOSs in the host system, in accordance with an embodiment of the invention. Referring to FIG. 4A, there is shown a NIC 210 that is substantially as described in FIGS. 2A-2B. In this regard, the NIC 210 may comprise an L2 switch 400. The L2 switch 400 may comprise suitable logic, circuitry, and/or code that may enable the NIC 210 to support packet communication between a GOS and the network and/or between GOSs, for example. The L2 switch 400 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses.

For example, the GOS 202*a* in FIG. 2A may send a packet to at least one device communicatively coupled to the network. In this instance, the GOS driver 226*a* may transfer the packet to the TX queue 208*b* corresponding to the GOS 202*a*. The L2 switch 400 may receive the packet from the TX queue 208*b* and may determine that the MAC address or addresses correspond to a device or devices on the network. The NIC 210 may then communicate the packet to the corresponding MAC address or addresses.

In another example, the GOS 202*a* may send a packet to the GOS 202*b* and/or the GOS 202*c*. In this instance, the GOS driver 226*a* may transfer the packet to the TX queue 208*b* corresponding to the GOS 202*a*. The L2 switch 400 may receive the packet from the TX queue 208*b* and may determine that the MAC address and/or addressed correspond to that of the GOS 202*b* and/or the GOS 202*c*. The L2 switch 400 may transfer the packet to the RX queue 212*c* and/or the RX queue 214*c* corresponding to the GOS 202*b* and/or the GOS 202*c*. The GOS driver 226*b* and/or the GOS driver 226*c* may be notified of the received packet and may post a buffer in the appropriate portion of the host memory 220. The operation or service executing on the GOS 202*b* and/or the GOS 202*c* may read the received packet from the posted buffer, for example.

The NIC 210 in FIG. 4A may also comprise an address validator 402. The address validator 402 may comprise suitable logic, circuitry, and/or code that may enable the validation of the address of a buffer posted by a GOS driver to store a received packet. For example, before a packet in an RX queue is transferred to a posted buffer, the address validator 402 may validate that the posted buffer is in an address or memory location that corresponds to the GOS associated with the received packet. When the address is validated, the received packet may be transferred from the RX queue to the posted buffer. When the address is not validated, the GOS driver may need to post a new buffer to receive the packet from the RX queue.

Figure 4B:
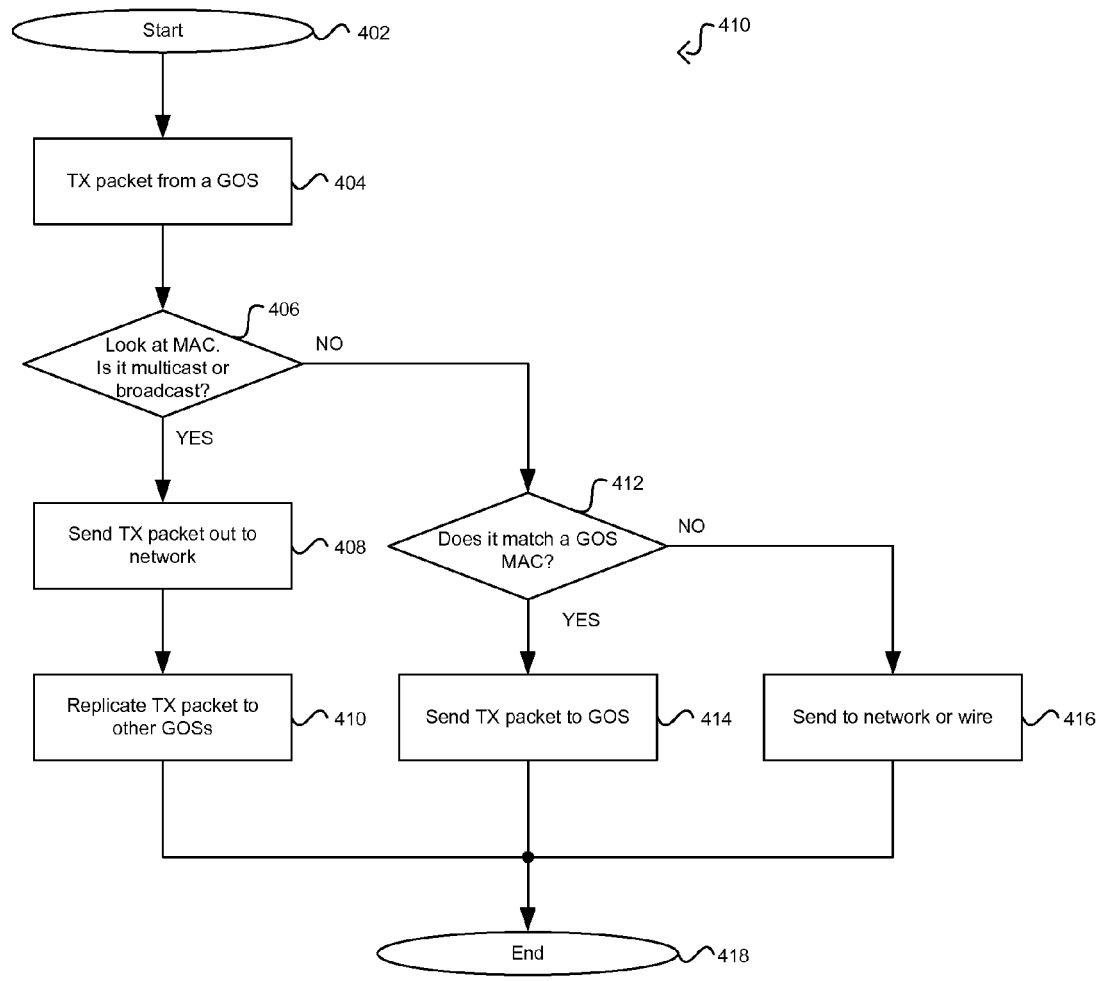
FIG. 4B is a flow diagram illustrating exemplary steps in unicasting, multicasting, and/or broadcasting via an OS virtualization-aware NIC, in accordance with an embodiment of the invention.

FIG. 4B is a flow diagram illustrating exemplary steps in unicasting, multicasting, and/or broadcasting via an OS virtualization-aware NIC, in accordance with an embodiment of the invention. Referring to FIG. 4, there is shown a flow diagram 410. After start step 402, in step 404, a packet may be generated for transmission by a GOS supported by the host system 206 in FIGS. 2A-2B. The GOS driver may transfer the packet to the appropriate TX queue. The L2 switch 400 in FIG. 4A may receive the packet from the TX queue and may determine the destination MAC address or addresses. In step 406, based on the MAC address or address corresponding to the destination of the packet, the L2 switch 400 may determine whether the packet transmission is to be a unicast, a broadcast, or a multicast. When the packet transmission is a multicast or a broadcast, the process of the flow diagram 410 may proceed to step 408.

In step 408, the L2 switch 400 may transfer the packet to the appropriate MAC addresses on the network that are listed as part of the multicast or broadcast transmission. In step 410, the L2 switch 400 may also transfer the packet to the RX queue of each GOS with a MAC address listed as part of the multicast or broadcast transmission. The GOS driver for each of the GOSs listed may be notified of the received packet and may post a buffer in the appropriate portion of the host memory 220. The operation or service executing on each of the GOSs listed may read the received packet from the posted buffer, for example. After step 410, the process of the flow diagram 410 may proceed to end step 418.

Returning to step 406, when the packet transmission is a unicast transmission, the process of the flow diagram 410 may proceed to step 412. In step 412, the L2 switch 400 may determine whether the MAC address corresponds to a GOS supported by the host system 206 or to a device on the wire or network. When the MAC address of the packet to be transmitted corresponds to a GOS, the process of the flow diagram 410 may proceed to step 414. In step 414, the L2 switch 400 may transfer the packet to the RX queue that corresponds to the GOS with the appropriate MAC address. The GOS driver may be notified of the received packet and may post a buffer in the appropriate portion of the host memory 220. The operation or service executing on the GOS may read the received packet from the posted buffer, for example. After step 414, the process of the flow diagram 410 may proceed to end step 418.

Returning to step 412, when the MAC address of the packet to be transmitted corresponds to a device on the network, the process of the flow diagram 410 may proceed to step 416. In step 416, the L2 switch 400 may transfer the packet to the appropriate MAC address on the network. After step 416, the process of the flow diagram 410 may proceed to end step 418.

The OS virtualization-aware NIC described herein may enable OS virtualization that reduces the overhead requirements of the hypervisor layer for communication of packets between a GOS and the network and/or between GOSs. The OS virtualization-aware NIC may support a plurality of GOSs. Moreover, the OS virtualization-aware NIC may enable the virtualization of advanced features such as TCP offload functions, RDMA, and/or iSCSI interfaces, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling processing of network information, the method comprising:
  receiving, by a physical network interface card of a host system, a network packet;
  determining a media access control (MAC) address of the received network packet;
  transferring the network packet to a receive (RX) queue that corresponds to a guest operating system with the MAC address, wherein the host system contains guest operating systems, each comprising a guest operating system queue,
  wherein each of the guest operating systems queues comprises at least one of a transmit (TX) queue, the receive (RX) queue, and an event queue, and the guest operating system queues are integrated into the single physical network interface card and the guest operating system queues correspond to a single physical network interface on the physical network interface card.

2. The method of claim 1, further comprising notifying one of the guest operating systems of an event via a corresponding event queue.

3. The method of claim 2, wherein the event comprises one of a link up event, a link down event, a packet transmitted event, and a packet received event.

4. The method of claim 1, wherein each guest operating system supported by the host system has a corresponding memory portion in host memory.

5. The method of claim 1, further comprising enabling transmission of data from a particular guest operating system by retrieving, by the physical network interface card, the data posted to the TX queue of the particular guest operating system; determining a destination MAC address of the data; and transferring the data to a location designated by the MAC address.

6. The method of claim 5, wherein the destination MAC address corresponds to another guest operating system and the data is transferred to a RX queue of the other guest operating system.

7. The method of claim 1, further comprising communicating data between at least two of the guest operating systems via the physical network interface card.

8. The method of claim 1, further comprising communicating, via a layer two switch of the physical network interface card, data between at least two of the guest operating systems by detecting when the destination MAC address of transmission data sent from a guest operating system corresponds to another guest operating system and transferring the transmission data to a RX queue of the other guest operating system.

9. A non-transitory machine-readable storage having stored thereon, a computer program having at least one code for handling network processing of network information, the at least one code section being executable by a machine for causing the machine to perform:
  receiving, by a physical network interface card of a host system, a network packet;
  determining a media access control (MAC) address of the received network packet;
  transferring the network packet to a receive (RX) queue that corresponds to a guest operating system with the MAC address, wherein the host system contains guest operating systems, each comprising a guest operating system queue, wherein each of the guest operating system queues comprises at least one of a transmit (TX) queue, the receive (RX) queue, and an event queue, and the guest operating system queues are integrated into the single physical network interface card and the guest operating system queues correspond to a single physical network interface on the physical network interface card.

10. The non-transitory machine-readable storage of claim 9, further comprising code that notifies one of the guest operating systems of an event via a corresponding event queue.

11. The non-transitory machine-readable storage of claim 10, wherein the event comprises one of a link up event, a link down event, a packet transmitted event, and a packet received event.

12. The non-transitory machine-readable storage of claim 9, further comprising code that enables transmission of data from a particular guest operating system by retrieving, by the network interface card, the data posted to the TX queue of the particular guest operating system; determines a destination MAC address of the data; and transfers the data to a location designated by the MAC address.

13. The non-transitory machine-readable storage of claim 12, wherein the destination MAC address corresponds to another guest operating system and the data is transferred to a RX queue of the other guest operating system.

14. The non-transitory machine-readable storage of claim 9, further comprising code that communicates data between at least two of the guest operating systems via the physical network interface card.

15. A system for handling processing of network information, the system comprising:
one or more processors within a physical network interface card that enables receiving a network packet and determining a media access control (MAC) address of the received network packet;
the one or more processors configured to transfer the received network packet to a receive (RX) queue that corresponds to a guest operating system with the MAC address, wherein a host system of the network interface card contains guess operating systems, each comprising a guest operating system queue,
wherein each of the guest operating system queues comprises at least one of a transmit (TX) queue, the receive (RX) queue, and an event queue, and the guest operating system queues are integrated into the single physical network interface card and the guest operating system queues correspond to a single physical network interface on the physical network interface card.

16. The system of claim 15, further comprising circuitry within the physical network interface card that enables indicating an occurrence of a communication event from the network interface card to one of the guest operating systems via the event queue in a corresponding guest operating system queue.

17. The system of claim 16, wherein the communication event is one of a link up event, a link down event, a packet transmitted event, and a packet received event.

18. The system of claim 15, further comprising circuitry within the physical network interface card that enables communication of data between at least two of the guest operating systems via the physical network interface card.

19. The system of claim 15, further comprising circuitry within the physical network interface card that enables validation of a media access control (MAC) address for a particular guest operating system buffered in the physical network interface card.

20. The system of claim 15, further comprising circuitry that enables transmission of data from a particular guest operating system by retrieving, by the physical network interface card, the data posted to the TX queue of the particular guest operating system; determines a destination MAC address of the data; and transfers the data to a location designated by the MAC address.

* * * * *